United States Patent
Xu et al.

(10) Patent No.: US 12,103,516 B2
(45) Date of Patent: Oct. 1, 2024

(54) PARKING-TRAJECTORY GENERATION METHOD COMBINED WITH OFFLINE AND ONLINE SOLUTIONS

(71) Applicants: Baidu USA LLC, Sunnyvale, CA (US); Baidu.com Times Technology (Beijing) Co., Ltd., Beijing (CN)

(72) Inventors: Xin Xu, Beijing (CN); Fan Zhu, Sunnyvale, CA (US); Dongchun Yao, Beijing (CN); Ning Yu, Beijing (CN)

(73) Assignees: BAIDU USA LLC, Sunnyvale, CA (US); Baidu.com Times Technology (Beijing) Co., Ltd., Beijing (CN)

( * ) Notice: Subject to any disclaimer, the term of this patent is extended or adjusted under 35 U.S.C. 154(b) by 229 days.

(21) Appl. No.: 16/759,062

(22) PCT Filed: Mar. 31, 2020

(86) PCT No.: PCT/CN2020/082398
§ 371 (c)(1),
(2) Date: Apr. 24, 2020

(87) PCT Pub. No.: WO2021/195951
PCT Pub. Date: Oct. 7, 2021

(65) Prior Publication Data
US 2021/0300333 A1     Sep. 30, 2021

(51) Int. Cl.
*B60W 30/06*     (2006.01)
*B60W 60/00*     (2020.01)
(Continued)

(52) U.S. Cl.
CPC ........ *B60W 30/06* (2013.01); *B60W 60/0011* (2020.02); *G05D 1/0274* (2013.01);
(Continued)

(58) Field of Classification Search
CPC .............. B60W 30/06; B60W 60/0011; G05D 1/0274; G06V 20/58; G06V 20/586;
(Continued)

(56) References Cited

U.S. PATENT DOCUMENTS

2011/0082613 A1     4/2011   Oetiker et al.
2015/0073661 A1*    3/2015   Raisch ................. B62D 15/027
                                                        701/41
(Continued)

FOREIGN PATENT DOCUMENTS

CN         108146432 A      6/2018
CN         108284831 A      7/2018
(Continued)

OTHER PUBLICATIONS

WO-2020103456-A1 Translation (Year: 2020).*
DE-102013015348-A1 Translation (Year: 2014).*

*Primary Examiner* — Kenneth J Malkowski
*Assistant Examiner* — Ibrahim Abdoalatif Alsomairy
(74) *Attorney, Agent, or Firm* — WOMBLE BOND DICKINSON (US) LLP

(57) ABSTRACT

In response to a request to park an ADV in a parking lot, a set of parking-trajectories associated with a set of predetermined locations near one or more parking spots in the parking lot may be obtained, where the set of parking-trajectories was previously generated based on prior collected planning and control data of the parking lot. Each parking-trajectory of the set of parking-trajectories may correspond to one parking spot of the one or more parking spots in the parking lot. A parking-trajectory may be selected from the set of parking-trajectories based on a current location of the ADV. The ADV may be controlled to park in a corresponding parking spot according to the selected parking-trajectory.

21 Claims, 12 Drawing Sheets

(51) Int. Cl.
  *G05D 1/00*  (2024.01)
  *G06V 20/58* (2022.01)
  *G08G 1/14*  (2006.01)

(52) U.S. Cl.
  CPC ............ *G06V 20/58* (2022.01); *G06V 20/586* (2022.01); *G08G 1/141* (2013.01)

(58) Field of Classification Search
  CPC ........ G08G 1/141; G08G 1/143; G08G 1/166; G08G 1/168; B62D 15/0285
  See application file for complete search history.

(56) References Cited

U.S. PATENT DOCUMENTS

| | | |
|---|---|---|
| 2015/0100193 A1 | 4/2015 | Inagaki et al. |
| 2017/0168490 A1* | 6/2017 | Ishijima ............... A01D 34/008 |
| 2017/0329342 A1 | 11/2017 | Kazama |
| 2018/0046198 A1* | 2/2018 | Nordbruch ........... G05D 1/0282 |
| 2018/0265130 A1* | 9/2018 | Derendarz ......... B62D 15/0285 |
| 2018/0281859 A1* | 10/2018 | Derendarz ........... G05D 1/0285 |
| 2019/0027042 A1* | 1/2019 | Fujishima ............. B60W 30/06 |
| 2020/0001863 A1 | 1/2020 | Li et al. |

FOREIGN PATENT DOCUMENTS

| | | | |
|---|---|---|---|
| CN | 108973987 A | 12/2018 | |
| CN | 109785652 A | 5/2019 | |
| CN | 109828591 A | 5/2019 | |
| CN | 110647142 A | 1/2020 | |
| CN | 110654376 A | 1/2020 | |
| DE | 102013015348 A1 * | 4/2014 | ............... B62D 1/02 |
| JP | 2018508082 A | 3/2018 | |
| JP | 2019194801 A | 11/2019 | |
| WO | 2019123586 A1 | 6/2019 | |
| WO | WO-2020103456 A1 * | 5/2020 | ............ B60W 30/06 |

* cited by examiner

| Parking Spot 602 | |
|---|---|
| Predetermined location | Parking-trajectory |
| 611 | 621 |
| 612 | 622 |
| 613 | 623 |
| 614 | 624 |
| 615 | 625 |
| 616 | 626 |

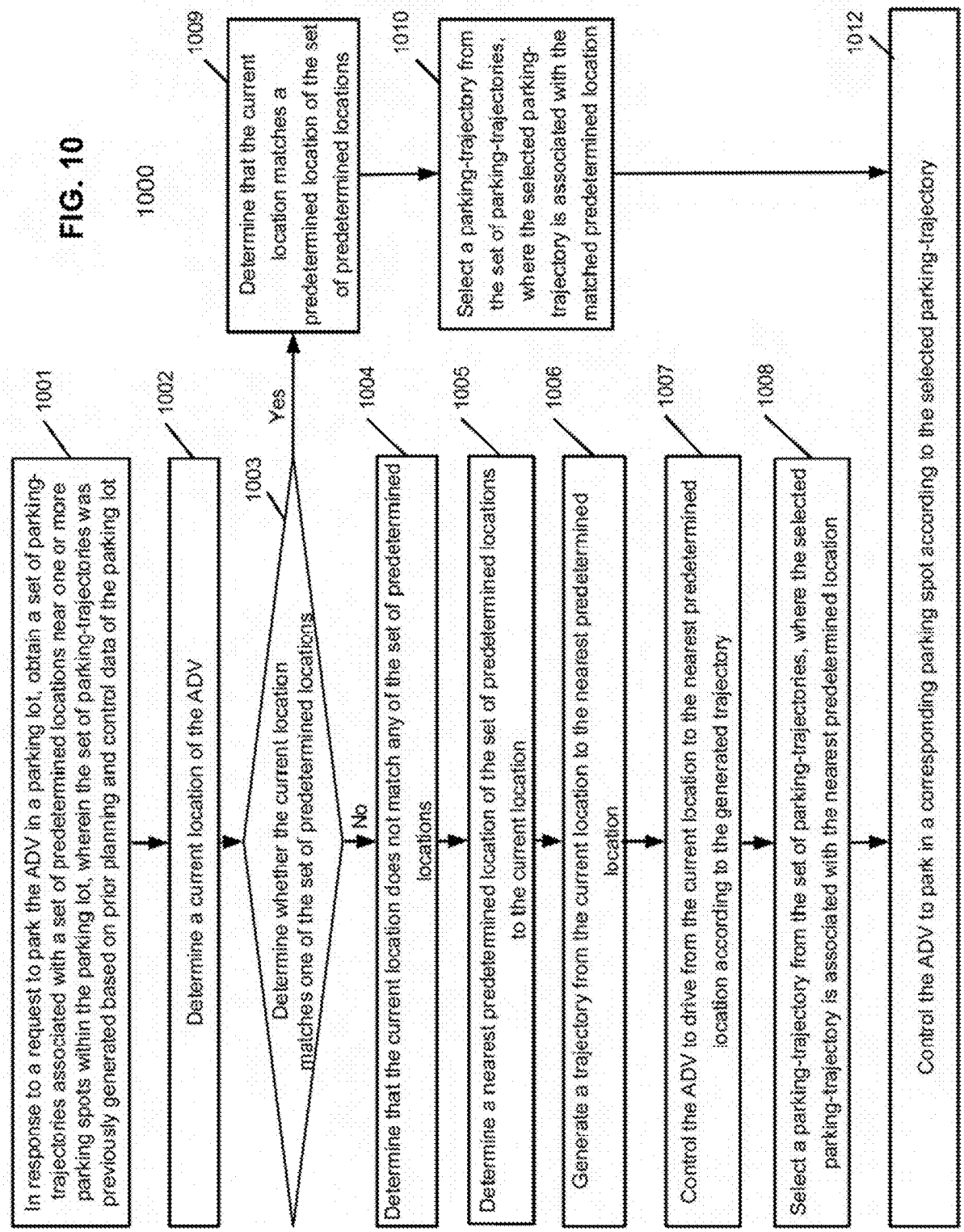

PARKING-TRAJECTORY GENERATION METHOD COMBINED WITH OFFLINE AND ONLINE SOLUTIONS

CROSS-REFERENCE TO RELATED APPLICATION

This patent application is a U.S. National Phase Application under 35 U.S.C. § 371 of International Application No. PCT/CN2020/082398, filed Mar. 31, 2020, entitled "A PARKING-TRAJECTORY GENERATION METHOD COMBINED WITH OFFLINE AND ONLINE SOLUTIONS," which is incorporated by reference herein by its entirety.

TECHNICAL FIELD

Embodiments of the present disclosure relate generally to operating autonomous vehicles. More particularly, embodiments of the disclosure relate to generating trajectories for an autonomous driving vehicle (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. Time is an important critical factor in many self-driving scenarios. Though self-driving vehicles require trajectory being generated in a real-time fashion in general, real-time trajectory generation often needs a large amount of computing resources. Thus, real-time trajectory generation is highly demanding in precious computing resources and may take a certain amount of time in complex scenarios.

BRIEF DESCRIPTION OF THE DRAWINGS

Embodiments of the disclosure are illustrated by way of example and not limitation in the figures of the accompanying drawings in which like references indicate similar elements.

FIG. 6B illustrated an example of a table storing a set of parking-trajectories generated offline.

FIG. 10 is a flow diagram illustrating a detailed example of a process to park an ADV in a parking spot by combining offline and online trajectory generation, according to some embodiments.

SUMMARY

Figure 1:
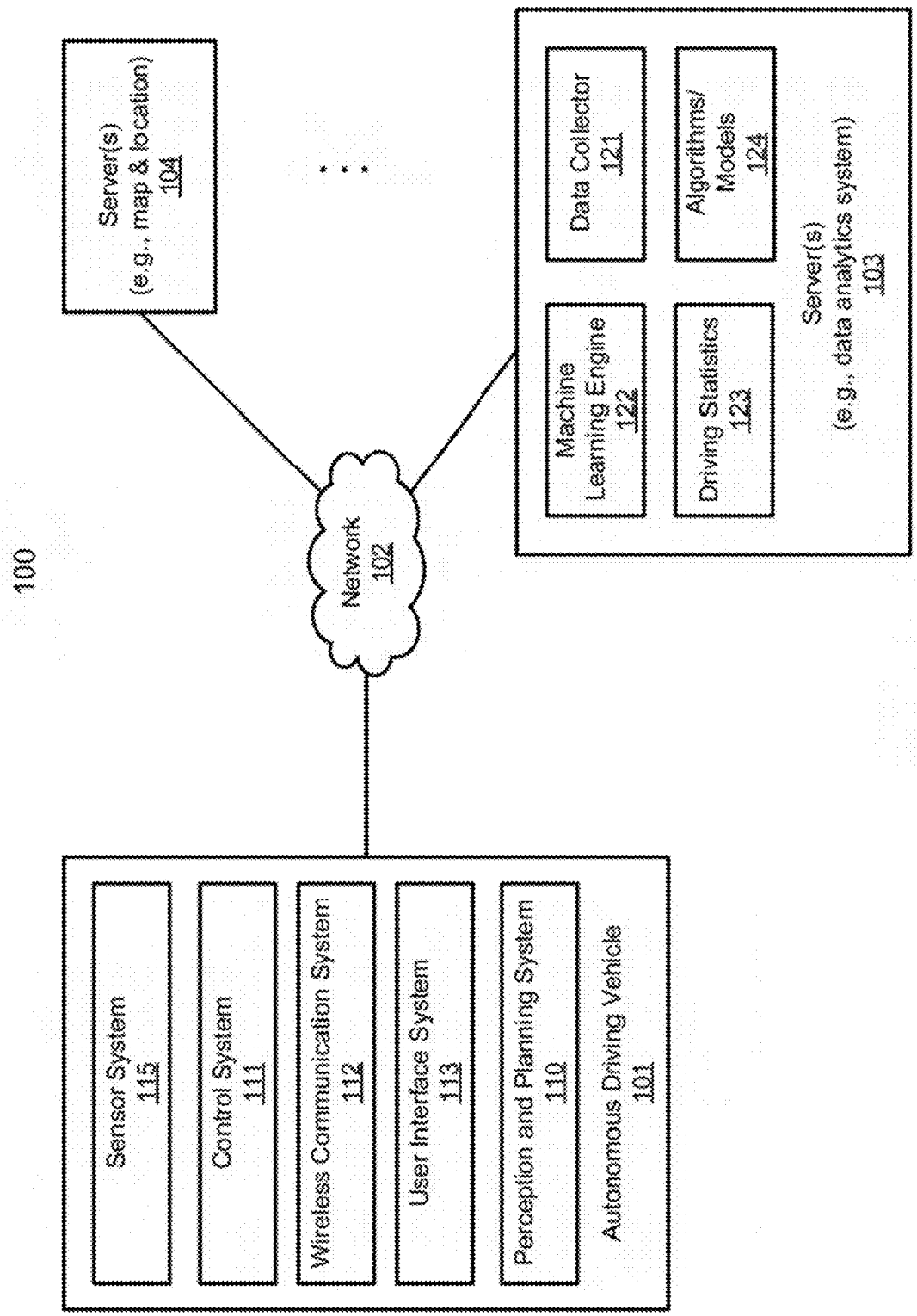
FIG. 1 is a block diagram illustrating a networked system according to one embodiment.

Embodiments of the present disclosure provide a computer-implemented method for operating an autonomous vehicle (ADV), a non-transitory machine-readable medium, and a data processing system.

According to a first aspect, some embodiments of the present disclosure provide a computer-implemented method for operating an autonomous driving vehicle (ADV), the method includes: in response to a request to park the ADV in a parking lot, obtaining a set of parking-trajectories associated with a set of predetermined locations near one or more parking spots within the parking lot, wherein the set of parking-trajectories was previously generated based on prior planning and control data of the parking lot, each of the parking-trajectories corresponding to one of the one or more parking spots within the parking lot; selecting a parking-trajectory from the set of parking-trajectories based on a current location of the ADV; and controlling the ADV to park in a corresponding parking spot according to the selected parking-trajectory.

According to a second aspect, some embodiments of the present disclosure provide a non-transitory machine-readable medium having instruction stored therein, which when executed by a processor, cause the processor to perform operations, the operations includes: in response to a request to park an autonomous driving vehicle (ADV) in a parking lot, obtaining a set of parking-trajectories associated with a set of predetermined locations near one or more parking spots within the parking lot, wherein the set of parking-trajectories was previously generated based on prior planning and control data of the parking lot, each of the parking-trajectories corresponding to one of the one or more parking spots within the parking lot; selecting a parking-trajectory from the set of parking-trajectories based on a current location of the ADV; and controlling the ADV to park in a corresponding parking spot according to the selected parking-trajectory.

According to a third aspect, some embodiments of the present disclosure provide a data processing system, the system includes: a processor; and a memory coupled to the processor to store instructions, which when executed by the processor, cause the processor to perform operations, the operations including: in response to a request to park the ADV in a parking lot, obtaining a set of parking-trajectories associated with a set of predetermined locations near one or more parking spots within the parking lot, wherein the set of parking-trajectories was previously generated based on prior planning and control data of the parking lot, each of the parking-trajectories corresponding to one of the one or more parking spots within the parking lot; selecting a parking-trajectory from the set of parking-trajectories based on a current location of the ADV, and controlling the ADV to park in a corresponding parking spot according to the selected parking-trajectory.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, an offline high definitional digital map may be first generated by collecting planning and control data of a parking lot. Once the digital map is generated, parking-trajectories for parking spots in the parking lot may be generated offline by using the digital map. For each parking spot in the digital map, parking-trajectories may be generated toward the parking spot for many feasible predetermined locations (offline calculated locations). If an ADV is in a different location than the predetermined locations (offline calculated locations), only a trajectory for the ADV to drive from the location to a closest predetermined location (offline calculated location) need to be generated in a real-time fashion. Once the ADV reaches the closest predetermined location (offline calculated location), the ADV may just need to fetch a corresponding parking-trajectory generated offline from the closest predetermined location to a corresponding parking spot and follow the fetched parking-trajectory. By combining the online and offline trajectory generation method, a low cost trajectory generation solution for parking scenarios is provided.

According to some embodiments, in response to a request to park an ADV in a parking lot, a set of parking-trajectories associated with a set of predetermined locations near one or more parking spots in the parking lot may be obtained, where the set of parking-trajectories was previously generated based on prior collected planning and control data of the parking lot. Each parking-trajectory of the set of parking-trajectories may correspond to one parking spot of the one or more parking spots in the parking lot. A parking-trajectory may be selected from the set of parking-trajectories based on a current location of the ADV. The ADV may be controlled to park in a corresponding parking spot according to the selected parking-trajectory.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
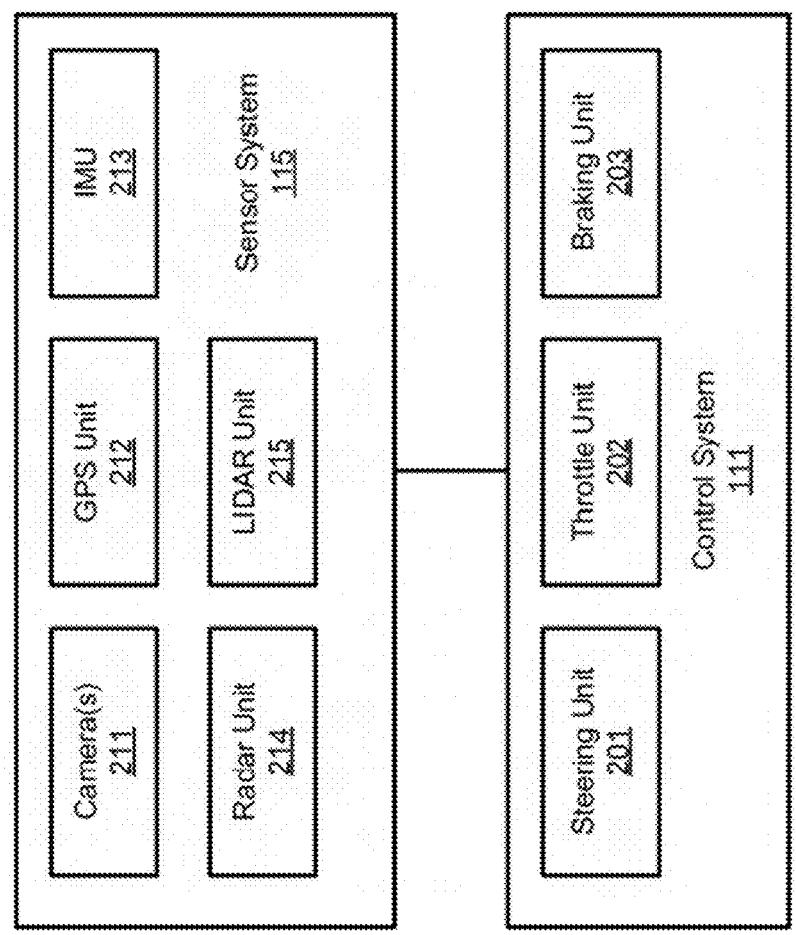
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm or model to generate a set of parking-trajectories according to a digital map based on prior planning and control data of a parking lot, an algorithm to obtain the set of parking-trajectories associated with a set of predetermined locations near one or more parking spots in the parking lot, an algorithm to select a parking-trajectory from the set of parking-trajectories based on a current location of an ADV, and/or an algorithm or predictive model to control the ADV to park in a corresponding parking spot according to the selected parking-trajectory, which will be described in details further below. Algorithms 124 can then be uploaded on ADVs (e.g., models 313 of FIG. 3A) to be utilized during autonomous driving in real-time.

Figure 3A:
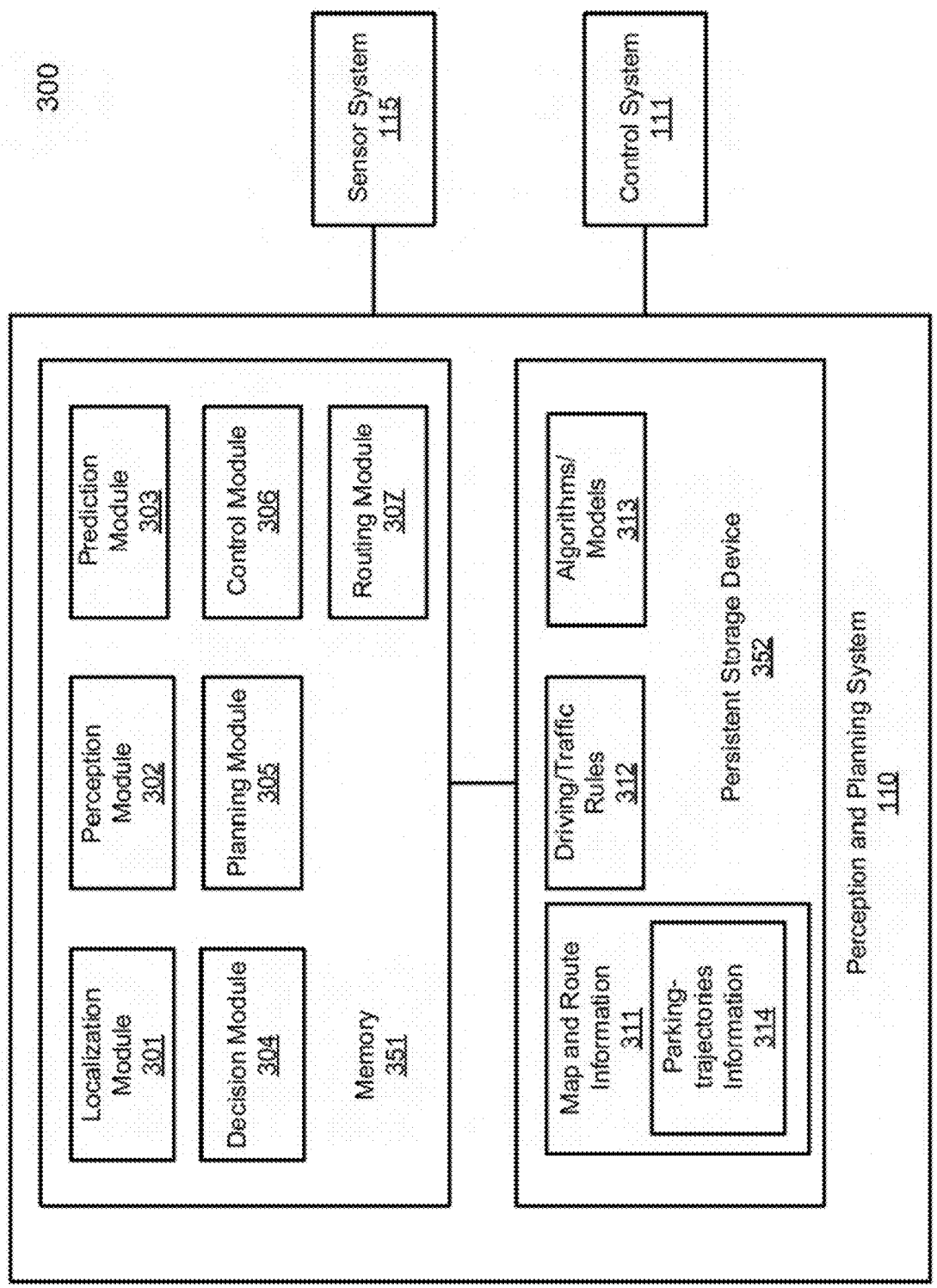
FIGS. 3A-3B are block diagrams illustrating an example of a perception and planning system used with an autonomous vehicle according to one embodiment.
Figure 3B:
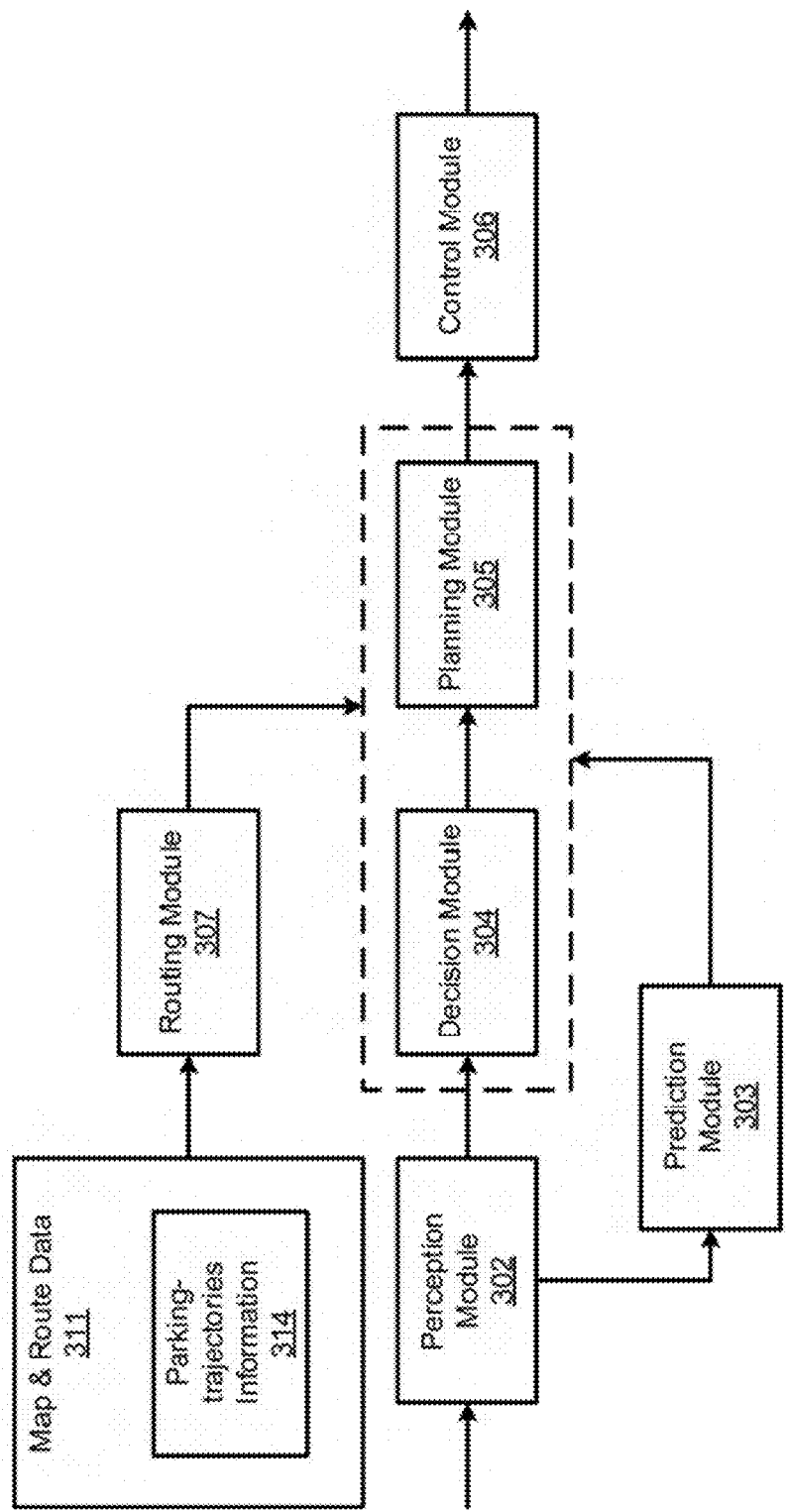

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user.

Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

In one embodiment, information of a parking lot, including lanes and one or more parking spots in the parking lot, may be collected. A high definition digital map may be generated based on the prior planning and control data of the parking lot. A set of parking-trajectories associated with a set of predetermined locations near the one or more parking spots within the parking lot may be generated according to the digital map. For each parking spot in the parking lot, a subset of the set of parking-trajectories may be generated for a subset of the set of predetermined locations near the parking spot. The set of parking-trajectories may be stored in parking-trajectory information 314 in map and route information 311.

According to one embodiment, planning module 305 may be configured to, in response to a request to park the ADV in a parking lot, obtain the set of parking-trajectories associated with the set of predetermined locations near the one or more parking spots in the parking lot, for example, from parking-trajectory information 314. The set of parking-trajectories may be previously generated based on prior planning and control data of the parking lot, and where each parking-trajectory of the set of parking-trajectories corresponds to one parking spot of the one or more parking spots in the parking lot. Planning module 305 may be further configured to select a parking-trajectory from the set of parking-trajectories based on a current location of the ADV. Control module 306 may be configured to control the ADV to park in a corresponding parking spot according to the selected parking-trajectory.

Figure 4:
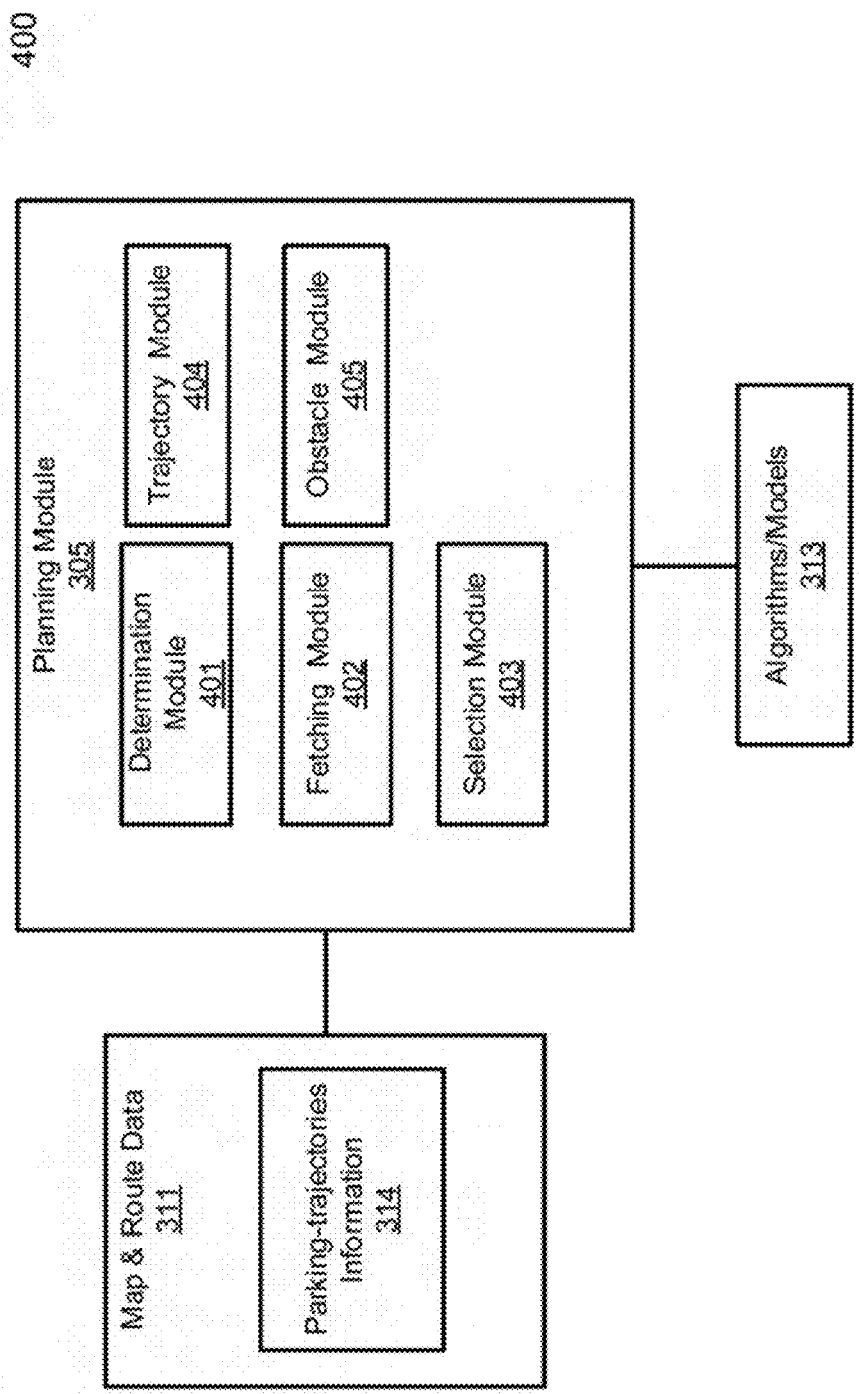
FIG. 4 is a block diagram illustrating an example of a planning module according to one embodiment.
Figure 5:
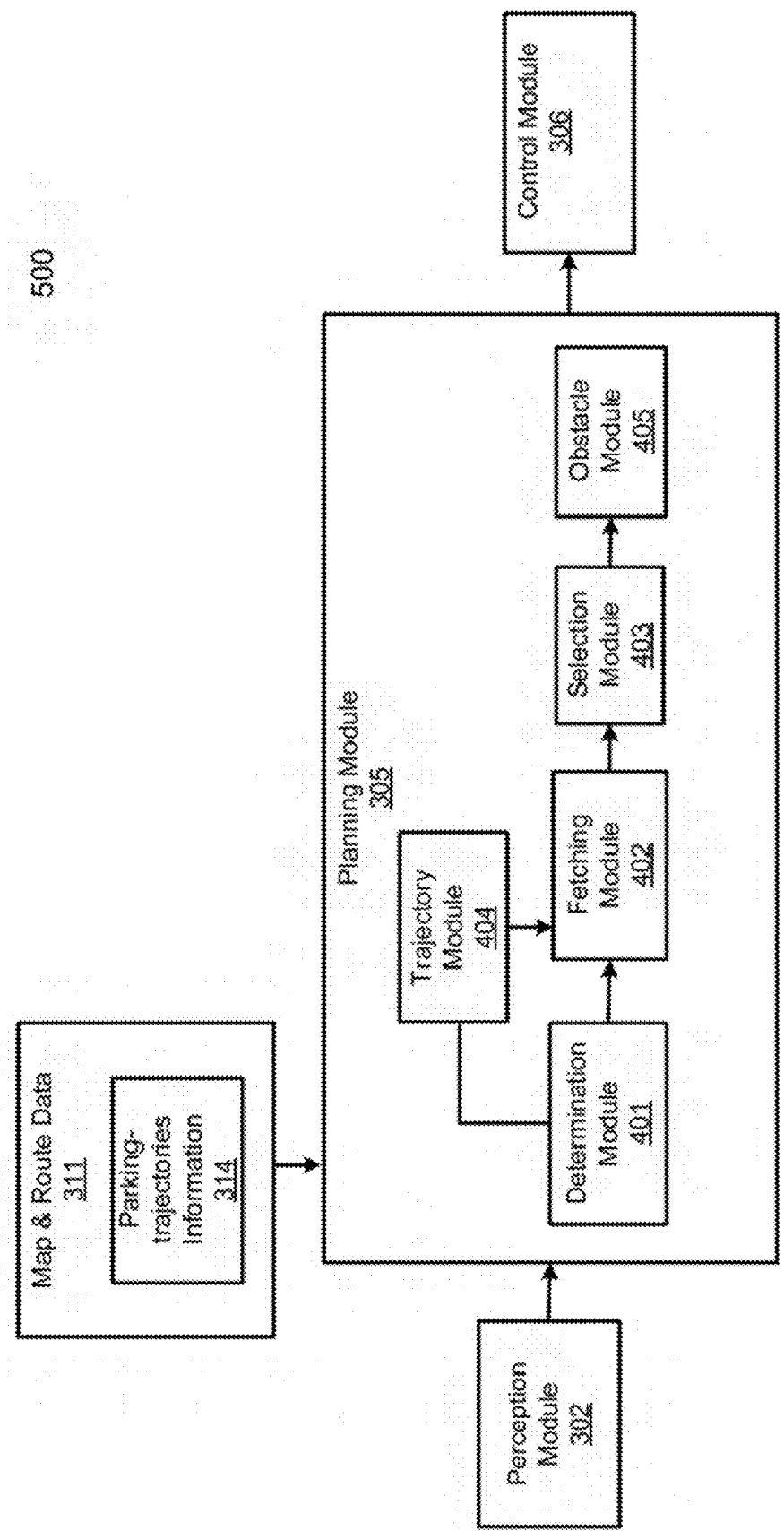
FIG. 5 is a processing flow diagram of a planning module according to one embodiment.

FIG. 4 is a block diagram illustrating an example of a planning module 305 and FIG. 5 is a processing flow diagram of a planning module 305 according to one embodiment. Referring to FIG. 4 and FIG. 5, planning module 305 includes, but is not limited to, determination module 401, fetching module 402, selection module 403, trajectory module 404 and obstacle module 405, which work together using stored parking trajectories information 314 to park the ADV in a corresponding parking spot according to a selected parking-trajectory. Note that modules 401-405 may be integrated into fewer number of modules or a single module.

According to one embodiment, in response to a request to park the ADV in a parking lot, fetching module 402 may be configured to obtain a set of parking-trajectories associated with a set of predetermined locations near one or more parking spots within the parking lot, where the set of parking-trajectories was previously generated based on prior planning and control data of the parking lot, and where each parking-trajectory of the set of parking-trajectories corresponds to one parking spot of the one or more parking spots within the parking lot. Selection module 403 may be configured to select a parking-trajectory from the set of parking-trajectories based on a current location of the ADV.

In one embodiment, determination module 401 may be configured to determine a current location of the ADV upon activating a parking function at the parking lot. Determination module 401 may be further configured to determine whether the current location matches one of a set of predetermined locations.

In one embodiment, determination module 401 may be configured to determine that the current location matches a predetermined location of the set of predetermined locations, where the selected parking-trajectory is associated with the matched predetermined location. Control module 306 may be configured to control the ADV to drive from the matched predetermined location to park in a corresponding parking spot according to the selected parking-trajectory.

In one embodiment, determination module 401 may be configured to determine that the current location does not match any of the set of predetermined locations. Determination module 401 may be further configured to determine a nearest predetermined location of the set of predetermined locations to the current location, where the selected parking-trajectory is associated with the nearest predetermined location. Trajectory module 404 may be configured to generate a trajectory from the current location to the nearest predetermined location. Control module 306 may be configured to control the ADV to drive from the current location to the nearest predetermined location according to the generated trajectory, and control the ADV to drive from the nearest predetermined location to park in a corresponding parking spot according to the selected parking-trajectory.

In one embodiment, perception module 302 may be configured to detect an obstacle blocking the selected parking-trajectory based on sensor data obtained from a plurality of sensors mounted on the ADV. Obstacle module 405 may be configured to send a command to stop the ADV in response to detecting the obstacle. Control module 306 may be configured to control the ADV to resume the selected parking-trajectory when the obstacle moves away.

Time is an important factor in many self-driving scenarios. Though an ADV may require a trajectory to be generated in a real-time fashion in general. However, real-time trajectory generation often needs a large amount of computing resources. Thus, real-time trajectory generation is highly demanding in precious computing resources and may take a certain amount of time in complex scenarios.

A less demanding real-time trajectory generation method may save precious computing resources for other components and speed up the trajectory generation process. There may be a need to develop a method using both offline and online parking-trajectory generation algorithms to achieve a low-cost, fast and real-time parking solution.

Figure 6A:
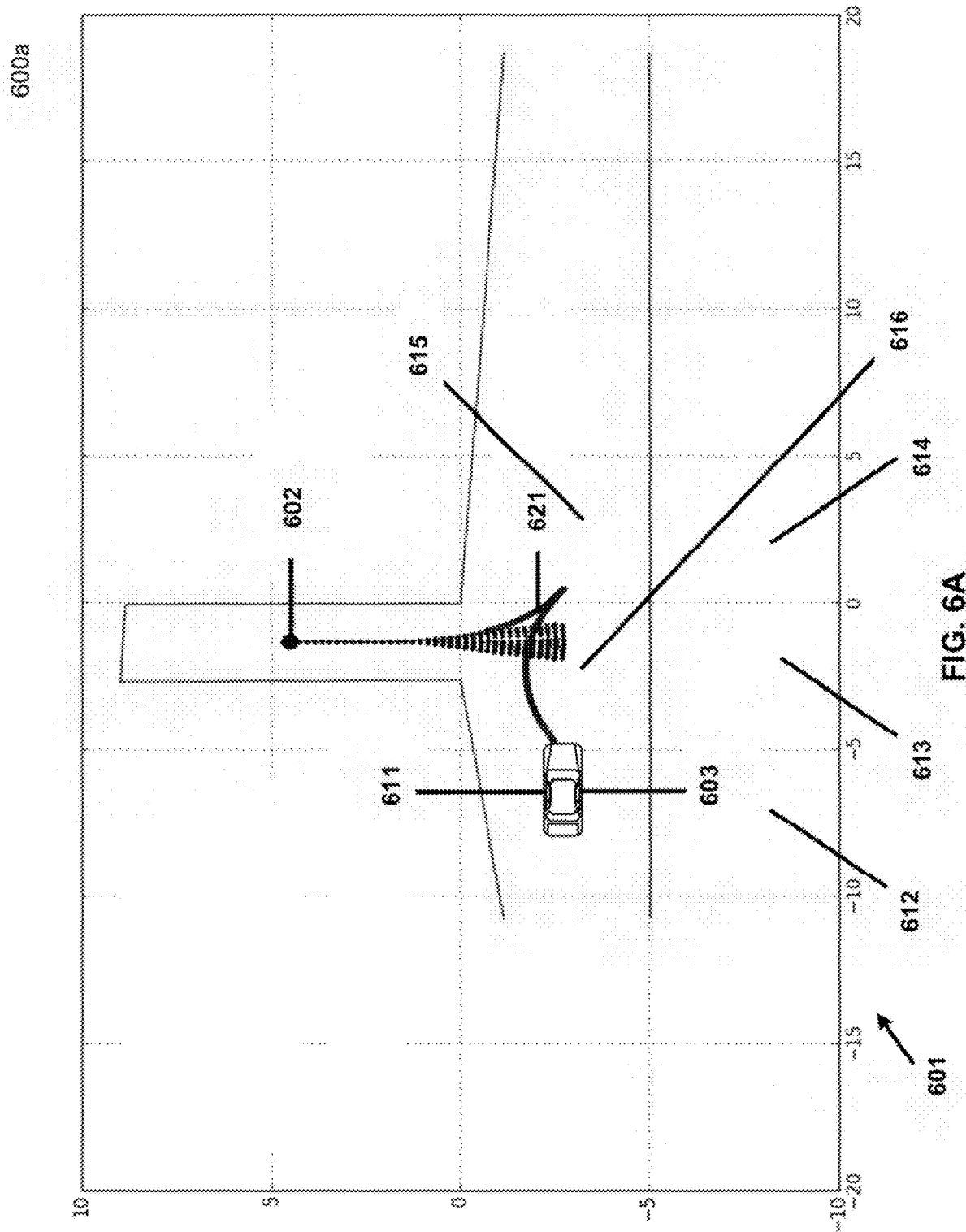
FIG. 6A is a diagram illustrating an example of an off-line generated parking-trajectory.

FIG. 6A is a diagram 600*a* illustrating an example of an off-line generated parking-trajectory. In a parking lot 601, planning and control data such as parking spots (e.g., 602), lanes, static obstacles, driving restrictions in the parking lot may be collected. An offline high definitional digital map (not shown) may be generated based on the collected planning and control data in the parking lot 601. The digital map includes all parking spots within the parking lot 601 that self-driving vehicles may park in. Once the digital map is built, parking-trajectories (e.g., 621) in the parking lot 601 may be generated offline.

In an offline process, the digital map may be divided into a grid, as illustrated in FIG. 6A. The resolution of the grid may be set to balance a computing time and a quality of parking-trajectory. In general, the higher the resolution, the higher the computing time and the better the generated parking-trajectories. Thus, there is a trade-off between the computing time and the quality of the generated parking-trajectories. For example, the resolution of the grid may be set to, for each parking-trajectory, a computing time to be in a 1~2 seconds.

In one embodiment, hybrid A-star (A*) searching algorithm or A* searching algorithm may be used to search for a parking-trajectory. A node in the grid may represent a predetermined/feasible location. A* searching algorithm is an informed search algorithm. Starting from a starting node of a graph, A* aims to find a route or a path to a destination node having the smallest cost (least distance travelled, shortest time, etc.). A* searching does this by maintaining a tree of paths originating at the start node and extending those paths one edge at a time until its termination criterion is satisfied. At each iteration of its main loop, A* determines which of its paths to extend based on the cost of the path and an estimate of the cost required to extend the path all the way to the destination node. The hybrid A* searching algorithm is a variant of the A* search algorithm applied to the 3-dimension (3D) kinematic state space of a vehicle, but with a modified state-update rule that captures continuous-state data in the discrete search nodes of A*. Just as in A* search algorithm, the search space (x, y, θ) is discretized, but unlike traditional A* which only allows visiting centers of cells, the hybrid A* search algorithm associates with each grid cell a continuous 3D state of the vehicle. The hybrid A* search algorithm may use the kinematic model of the ADV. The resulting route or path from the hybrid A* search algorithm is to be drivable, rather than being piecewise-linear as in the case of A* search algorithm.

For each parking spot (e.g., 602) in the map, parking-trajectories toward the parking spot (e.g., 602) for one or more feasible locations (e.g., 611, 612, 613, 6145, 615, 616), which are predetermined locations, may be generated. For example, for the parking spot 602, there may be one or more feasible locations/predetermined locations to drive from to the parking spot 602. The one or more feasible locations/predetermined locations near the parking spot 602 may include predetermined locations 611, 612, 613, 614, 615, 616, etc. For each parking spot, the predetermined/feasible locations near the parking spot may be determined based on a predetermined threshold distance to the parking spot. For example, the predetermined threshold distance to the parking spot may be 5 meters, 10 meters, 15 meters, 20 meters, or any values therebetween. The higher the resolution of the digital map, the more predetermined locations near the one or more parking spots in the parking lot. For example, for each parking spot in the parking lot, a number/quantity of predetermined locations near the parking lot may be 10, 20, 30, 50, 80, 100, or any values therebetween. For each predetermined location, a parking-trajectory starting from the predetermined location to a corresponding parking spot may be generated.

As an example, for the predetermined location 611, a parking-trajectory 621 may be generated by using hybrid A* search algorithm. A starting node may be a node representing the predetermined location 611, and a destination node may be a node representing the parking spot 602. Hybrid A* search algorithm may be used to find the parking-trajectory 621 from the predetermined location 611 to the corresponding parking spot 602. Similarly, hybrid A* search algorithm may be used to find a subset of parking-trajectories (e.g., 621, 622, 623, 624, 625, 626, as illustrated in FIG. 6B) from a subset of predetermined locations (e.g., 611, 612, 613, 614, 615, 616) to the corresponding parking spot (e.g., 602). Thus, a set of parking-trajectories from a set of predetermined locations to all the parking spots within the parking lot may be generated offline, e.g., by using hybrid A* search algorithm may.

FIG. 6B illustrated an example of a part of a table 600b storing a set of parking-trajectories generated offline, which may be stored in a data structure such as a parking trajectory table as shown. For each parking spot (e.g., 602), a subset of parking-trajectories (e.g., 621, 622, 623, 624, 625, 626) for a subset of predetermined locations (e.g., 611, 612, 613, 614, 615, 616) near the parking spot (e.g., 602) may be generated offline and stored. Once parking-trajectories for all feasible locations/predetermined locations in the grid are generated (which usually takes minutes or even hours), those trajectories are then may be stored in a table, e.g., as illustrated in FIG. 6B. Thus, a set of parking-trajectories for a set of predetermined locations near all the parking spots in a parking lot may be generated and stored in the table. The parking trajectory table may be stored as a part of parking trajectories information 314.

Figure 7:
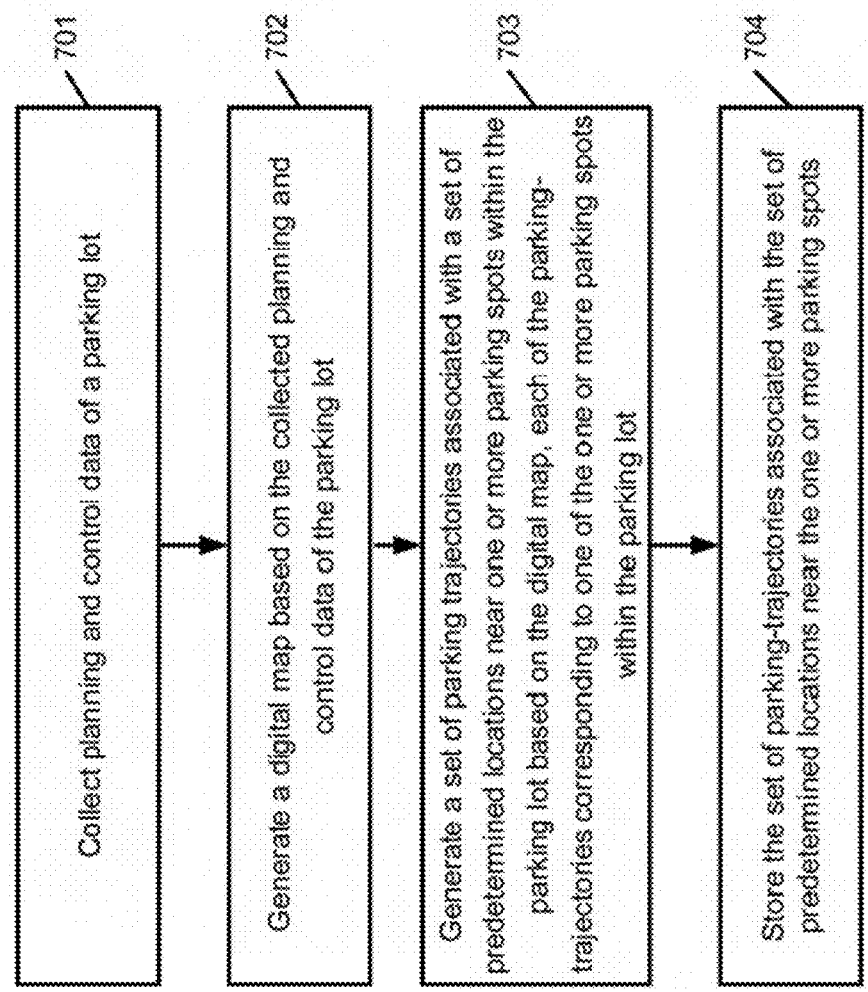
FIG. 7 is a flow diagram illustrating an example of a process to generate a set of parking-trajectories offline, according to one embodiment.

FIG. 7 is a flow diagram illustrating an example of a process to generate a set of parking-trajectories offline, according to one embodiment. Process 700 may be performed by processing logic which may include software, hardware, or a combination thereof. Process 700 may be performed by an ADV, a computer, or any type of computing devices. Referring to FIG. 7, in operation 701, processing logic collects planning and control data of a parking lot. In operation 702, processing logic generates a digital map based on the collected planning and control data of the parking lot. In operation 703, processing logic generates a set of parking-trajectories associated with a set of predetermined locations near one or more parking spots within the parking lot based on the digital map, where each of the parking-trajectories corresponds to one of the one or more parking spots within the parking lot. In operation 704, processing logic stores the set of parking-trajectories associated with the set of predetermined locations near the one or more parking spots within the parking lot.

Figure 8:
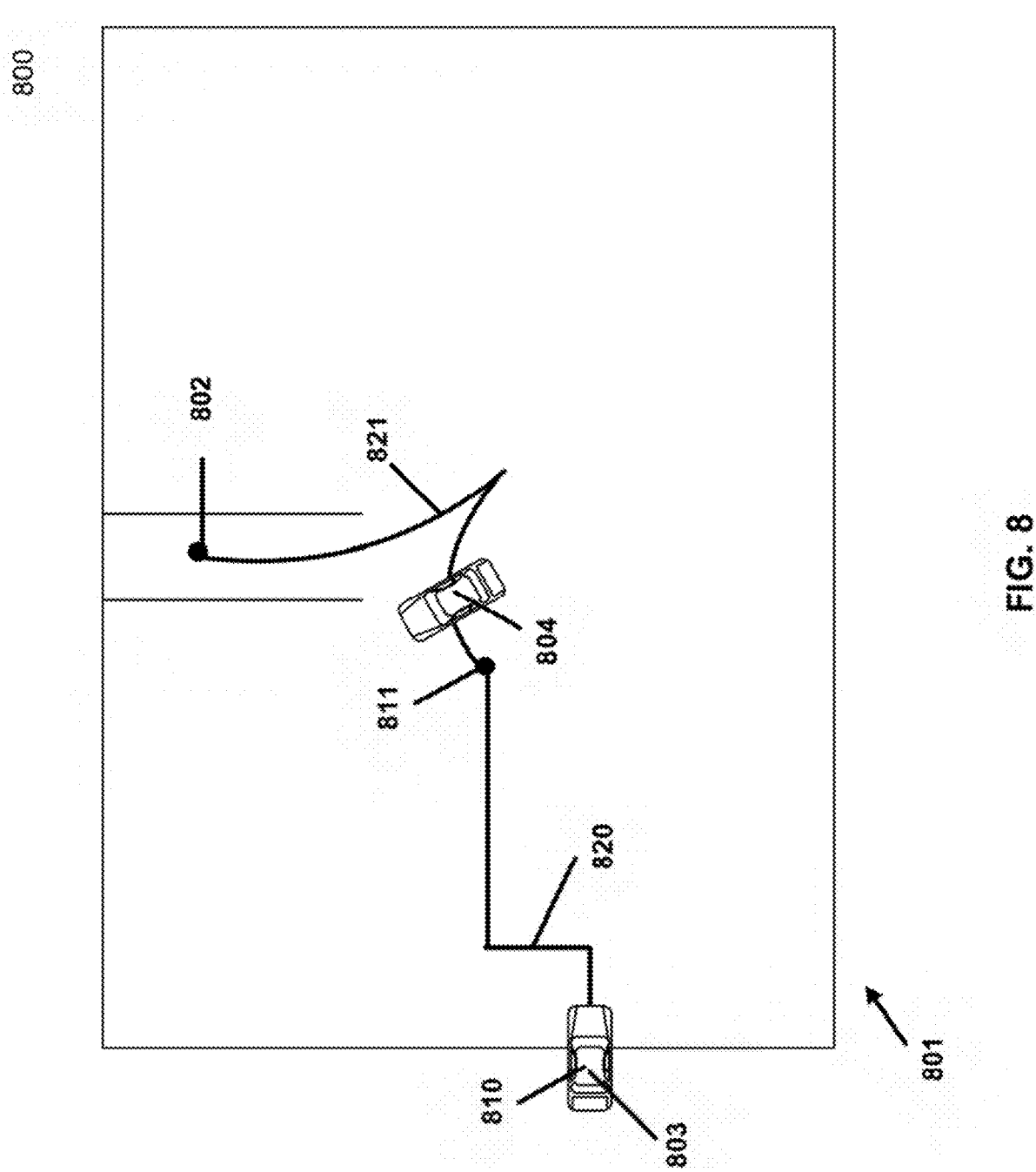
FIG. 8 illustrates an example of a method to park an ADV in a parking spot by combining offline and online trajectory generation, according to some embodiments.

FIG. 8 illustrates an example of a method to park an ADV in a parking spot by combining offline and online trajectory generation, according to some embodiments. In this method, offline and online trajectory generation algorithms are combined to achieve a low-cost, fast and real-time parking solution.

Referring to FIG. 8, in an online step, an ADV 803 may reach a parking lot 801 and decide to activate a parking function. Once activated, the ADV 803 may be configured to determine the ADV's real-time current location 810, for example, from localization module 301. The ADV 803 may be configured to compare the current location 810 with a set of offline stored predetermined locations (e.g., 811) associated with a set of off-line generated parking-trajectories (e.g., 821). For example, the set of offline stored predetermined locations and the set of off-line generated parking-trajectories may be stored in a table, as illustrated in FIG. 6B. The ADV 803 may be configured to obtain the set of off-line generated parking-trajectories associated with the set of offline stored predetermined locations, for example, by fetching module 402.

In one embodiment, if the current location of the ADV matches a predetermined location associate with one trajectory of the set of parking-trajectories, the corresponding parking-trajectory associated with the matched predetermined location is then selected, e.g., by selection module 403. The corresponding parking-trajectory may be sent to control module 306.

In one embodiment, if the current location 810 of the ADV 803 does not match any of the predetermined locations in the stored table, a nearest predetermined location 811 or feasible location from the stored table may be determined. A parking-trajectory 821 associated with the nearest predetermined location 811 may be selected, e.g., by selection module 403. The ADV 803 may be configured to generate a trajectory 820 guiding the ADV 803 towards the nearest predetermined location 811. Once reached the nearest predetermined location 811 that is stored in the table, the corresponding parking-trajectory 821 associated with the nearest predetermined location 811 may be sent to control module 306.

In this method, the ADV 803 only needs to generate a trajectory 820 driving the ADV 803 from the current location 810 towards the predetermined location 811, which is offline calculated location, in a real-time fashion. Once the ADV 803 reaches the predetermined location 811 (the offline calculated location), the ADV 803 just needs to fetch the corresponding parking-trajectory 821 generated offline, and follow the parking-trajectory 821 to park in the corresponding parking spot 802. By combining the online and offline trajectory generation method, a fast, low cost and real-time parking-trajectory generation solution for parking scenarios is provided.

In one embodiment, the set of offline generated parking-trajectories (e.g., 821) based on the digital map do not include any information about obstacles, which is an ideal situation. If there is an obstacle 804 during actual parking, perception module 302 may be configured to detect the obstacle 804 that is blocking the selected parking-trajectory 821, based on sensor data obtained from a plurality of sensors mounted on the ADV 803. In response to detecting the obstacle 804, obstacle module 405 may be configured to send a command to stop the ADV 803 in front of the obstacle 804, instead of driving around the obstacle 804. Once the obstacle 804 moves away, control module 306 may be configured to control the ADV 803 to resume the selected parking-trajectory 821 until the ADV 803 is parked into the parking spot 802.

Figure 9:
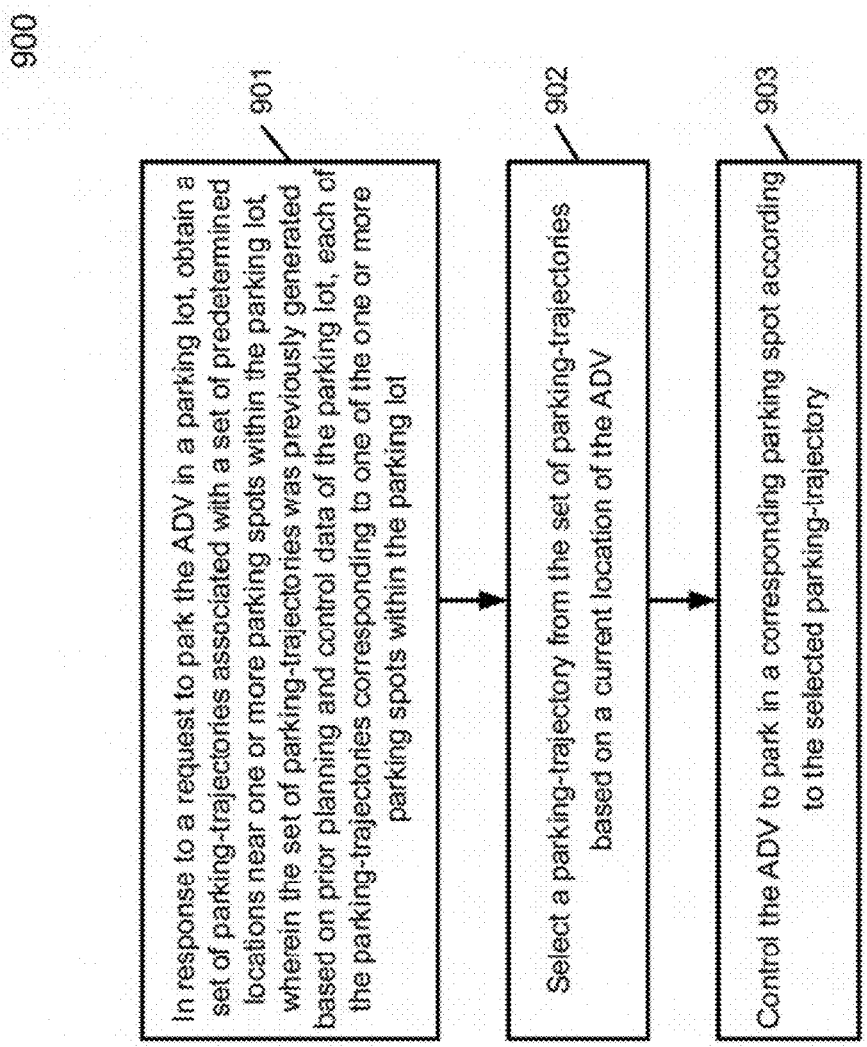
FIG. 9 is a flow diagram illustrating an example of a process to park an ADV in a parking spot by combining offline and online trajectory generation, according to some embodiments.

FIG. 9 is a flow diagram illustrating an example of a process to park an ADV in a parking spot by combining offline and online trajectory generation, according to some embodiments. Process 900 may be performed by processing logic which may include software, hardware, or a combination thereof. For example, process 900 may be performed by planning module 305 and control module 306. Referring to FIG. 9, in operation 901, processing logic, in response to a request to park the ADV in a parking lot, obtains a set of parking-trajectories associated with a set of predetermined locations near one or more parking spots within the parking lot, wherein the set of parking-trajectories was previously generated based on prior planning and control data of the parking lot, each of the parking-trajectories corresponding to one of the one or more parking spots within the parking lot. In operation 902, processing logic selects a parking-trajectory from the set of parking-trajectories based on a current location of the ADV. In operation 903, processing logic controls the ADV to park in a corresponding parking spot according to the selected parking-trajectory.

In one embodiment, processing logic may determine a current location of the ADV upon activating a parking function at the parking lot, and determine whether the current location matches one of the set of predetermined locations.

In one embodiment, processing logic may determine that the current location matches a predetermined location of the set of predetermined locations, wherein the selected parking-trajectory is associated with the matched predetermined location.

In one embodiment, processing logic may determine that the current location does not match any of the set of predetermined locations, and determine a nearest predetermined location of the set of predetermined locations to the current location, where the selected parking-trajectory is associated with the nearest predetermined location. Processing logic may generate a trajectory from the current location to the nearest predetermined location, and control the ADV to drive from the current location to the nearest predetermined location according to the generated trajectory.

In one embodiment, the set of parking-trajectories was previously generated according to a digital map based on the prior planning and control data of the parking lot. In one embodiment, the prior planning and control data of the parking lot includes information related to the one or more parking spots and lanes within the parking lot. In one embodiment, for each parking spot of the one or more parking spots, a subset of parking-trajectories was generated for a subset of predetermined locations near the parking spot.

In one embodiment, processing logic may detect an obstacle blocking the selected parking-trajectory based on sensor data obtained from a plurality of sensors mounted on the ADV. Processing logic may send a command to stop the ADV in response to detecting the obstacle. Processing logic may control the ADV to resume the selected parking-trajectory when the obstacle moves away.

FIG. 10 is a flow diagram illustrating a detailed example of a process to park an ADV in a parking spot by combining offline and online trajectory generation, according to some embodiments. Process 1000 may be performed by processing logic which may include software, hardware, or a combination thereof. For example, process 1000 may be performed by planning module 305 and control module 306. Referring to FIG. 10, in operation 1001, processing logic, in response to a request to park the ADV in a parking lot, obtains a set of parking-trajectories associated with a set of predetermined locations near one or more parking spots within the parking lot, wherein the set of parking-trajectories was previously generated based on prior planning and control data of the parking lot, each of the parking-trajectories corresponding to one of the one or more parking spots within the parking lot.

In operation 1002, processing logic may determine a current location of the ADV upon activating a parking function at the parking lot. In operation 1003, processing logic may determine whether the current location matches one of the set of predetermined locations.

In operation 1004, processing logic may determine that the current location does not match any of the set of predetermined locations. In operation 1005, processing logic may determine a nearest predetermined location of the set of predetermined locations to the current location. In operation 1006, processing logic may generate a trajectory from the current location to the nearest predetermined location. In operation 1007, processing logic may control the ADV to drive from the current location to the nearest predetermined location according to the generated trajectory.

In operation 1008, processing logic selects a parking-trajectory from the set of parking-trajectories, where the selected parking-trajectory is associated with the nearest predetermined location. In operation 1009, processing logic may determine that the current location matches a predetermined location of the set of predetermined locations. In operation 1010, processing logic selects a parking-trajectory from the set of parking-trajectories, wherein the selected parking-trajectory is associated with the matched predetermined location. In operation 1012, processing logic controls the ADV to park in a corresponding parking spot according to the selected parking-trajectory.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

The invention claimed is:

1. A computer-implemented method for operating an autonomous driving vehicle (ADV), the method comprising:
in response to a request to park the ADV in a parking lot, obtaining a set of parking-trajectories associated with a set of predetermined locations in proximity to one or more parking spots within the parking lot based on a predetermined threshold distance to the one or more parking spots, wherein, for each parking spot of the one or more parking spots, one or more of the set of predetermined locations in proximity to a parking spot are determined based on the predetermined threshold distance to the parking spot and a resolution of a grid of a digital map, wherein the set of parking-trajectories was previously generated based on prior planning and control data of the parking lot by using a hybrid A* search algorithm, each of the parking-trajectories corresponding to one of the one or more parking spots within the parking lot;
comparing a current location of the ADV with the set of predetermined locations associated with the set of parking-trajectories corresponding to the one or more parking spots within the parking lot;
determining that the current location of the ADV does not include one of the set of predetermined locations associated with the set of parking-trajectories corresponding to the one or more parking spots;
generating a trajectory from the current location to a predetermined location of the set of predetermined locations nearest to the current location without using a previously generated parking-trajectory of the set of previously generated parking-trajectories;
selecting a previously generated parking-trajectory from the set of previously generated parking-trajectories based on the predetermined location nearest to the current location of the ADV; and
controlling the ADV to drive from the current location to the predetermined location nearest to the current location according to the generated trajectory and park in a corresponding parking spot according to the selected previously generated parking-trajectory.

2. The method of claim 1, further comprising:
determining a current location of the ADV upon activating a parking function at the parking lot; and
determining whether the current location matches one of the set of predetermined locations.

3. The method of claim 2, further comprising:
determining the current location does not match any of the set of predetermined locations within a predetermined threshold, and
determining the predetermined location of the set of predetermined locations nearest to the current location,
where the selected parking-trajectory is associated with the predetermined location.

4. The method of claim 1, wherein the set of parking-trajectories was previously generated according to the digital map based on the prior planning and control data of the parking lot.

5. The method of claim 1, wherein the prior planning and control data of the parking lot includes information related to the one or more parking spots and lanes within the parking lot.

6. The method of claim 1, wherein, for each parking spot of the one or more parking spots, a subset of parking-trajectories was generated for a subset of predetermined locations in proximity to the parking spot.

7. The method of claim 1, further comprising:
detecting an obstacle blocking the selected parking-trajectory based on sensor data obtained from a plurality of sensors mounted on the ADV;
sending a command to stop the ADV in response to detecting the obstacle; and
controlling the ADV to resume the selected parking-trajectory when the obstacle moves away.

8. A non-transitory machine-readable medium having instructions stored therein, which when executed by a processor, cause the processor to perform operations, the operations comprising:
in response to a request to park an autonomous driving vehicle (ADV) in a parking lot, obtaining a set of parking-trajectories associated with a set of predetermined locations in proximity to one or more parking spots within the parking lot based on a predetermined threshold distance to the one or more parking spots, wherein, for each parking spot of the one or more parking spots, one or more of the set of predetermined locations in proximity to a parking spot are determined based on the predetermined threshold distance to the parking spot and a resolution of a grid of a digital map, wherein the set of parking-trajectories was previously generated based on prior planning and control data of the parking lot by using a hybrid A* search algorithm, each of the parking-trajectories corresponding to one of the one or more parking spots within the parking lot;
comparing a current location of the ADV with the set of predetermined locations associated with the set of parking-trajectories corresponding to the one or more parking spots within the parking lot;
determining that the current location of the ADV does not include one of the set of predetermined locations associated with the set of parking-trajectories corresponding to the one or more parking spots;
generating a trajectory from the current location to a predetermined location of the set of predetermined locations nearest to the current location without using a previously generated parking-trajectory of the set of previously generated parking-trajectories;
selecting a previously generated parking-trajectory from the set of previously generated parking-trajectories based on the predetermined location nearest to the current location of the ADV; and
controlling the ADV to drive from the current location to the predetermined location nearest to the current location according to the generated trajectory and park in a corresponding parking spot according to the selected previously generated parking-trajectory.

9. The medium of claim 8, wherein the operations further comprise:
determining a current location of the ADV upon activating a parking function at the parking lot; and
determining whether the current location matches one of the set of predetermined locations.

10. The medium of claim 9, wherein the operations further comprise
determining the current location does not match any of the set of predetermined locations within a predetermined threshold, and
determining the predetermined location of the set of predetermined locations nearest to the current location,
where the selected parking-trajectory is associated with the predetermined location.

11. The medium of claim 8, wherein the set of parking-trajectories was previously generated according to the digital map based on the prior planning and control data of the parking lot.

12. The medium of claim 8, wherein the operations further comprise:
detecting an obstacle blocking the selected parking-trajectory based on sensor data obtained from a plurality of sensors mounted on the ADV;
sending a command to stop the ADV in response to detecting the obstacle; and
controlling the ADV to resume the selected parking-trajectory when the obstacle moves away.

13. A data processing system, comprising:
a processor; and
a memory coupled to the processor to store instructions, which when executed by the processor, cause the processor to perform operations, the operations including:
in response to a request to park the ADV in a parking lot, obtaining a set of parking-trajectories associated with a set of predetermined locations in proximity to one or more parking spots within the parking lot based on a predetermined threshold distance to the one or more parking spots, wherein, for each parking spot of the one or more parking spots, one or more of the set of predetermined locations in proximity to a parking spot are determined based on the predetermined threshold distance to the parking spot and a resolution of a grid of a digital map, wherein the set of parking-trajectories was previously generated based on prior planning and control data of the parking lot by using a hybrid A* search algorithm, each of the parking-trajectories corresponding to one of the one or more parking spots within the parking lot,
comparing a current location of the ADV with the set of predetermined locations associated with the set of parking-trajectories corresponding to the one or more parking spots within the parking lot;
determining that the current location of the ADV does not include one of the set of predetermined locations associated with the set of parking-trajectories corresponding to the one or more parking spots;

generating a trajectory from the current location to a predetermined location of the set of predetermined locations nearest to the current location without using a previously generated parking-trajectory of the set of previously generated parking-trajectories;

selecting a previously generated parking-trajectory from the set of previously generated parking-trajectories based on the predetermined location nearest to the current location of the ADV, and controlling the ADV to drive from the current location to the predetermined location nearest to the current location according to the generated trajectory and park in a corresponding parking spot according to the selected previously generated parking-trajectory.

14. The system of claim 13, wherein the operations further comprise:
   determining a current location of the ADV upon activating a parking function at the parking lot; and
   determining whether the current location matches one of the set of predetermined locations.

15. The system of claim 14, wherein the operations further comprise:
   determining the current location does not match any of the set of predetermined locations within a predetermined threshold, and
   determining the predetermined location of the set of predetermined locations nearest to the current location,
   where the selected parking-trajectory is associated with the predetermined location.

16. The medium of claim 8, wherein the prior planning and control data of the parking lot includes information related to the one or more parking spots and lanes within the parking lot.

17. The medium of claim 8, wherein, for each parking spot of the one or more parking spots, a subset of parking-trajectories was generated for a subset of predetermined locations in proximity to the parking spot.

18. The system of claim 13, wherein the set of parking-trajectories was previously generated according to the digital map based on the prior planning and control data of the parking lot.

19. The system of claim 13, wherein the prior planning and control data of the parking lot includes information related to the one or more parking spots and lanes within the parking lot.

20. The system of claim 13, wherein, for each parking spot of the one or more parking spots, a subset of parking-trajectories was generated for a subset of predetermined locations in proximity to the parking spot.

21. The system of claim 13, wherein the operations further comprises:
   detecting an obstacle blocking the selected parking-trajectory based on sensor data obtained from a plurality of sensors mounted on the ADV;
   sending a command to stop the ADV in response to detecting the obstacle; and
   controlling the ADV to resume the selected parking-trajectory when the obstacle moves away.

* * * * *